Feb. 27, 1940. R. S. DRUMMOND 2,191,559
METHOD OF MILLING FLAT SURFACES
Filed May 2, 1938 2 Sheets-Sheet 1

INVENTOR
ROBERT S. DRUMMOND
BY
Whittemore, Hulbert & Belknap
ATTORNEYS

Feb. 27, 1940.    R. S. DRUMMOND    2,191,559
METHOD OF MILLING FLAT SURFACES
Filed May 2, 1938    2 Sheets-Sheet 2
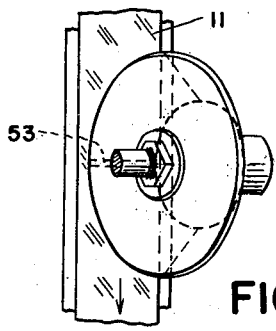
FIG. 5<sup>A</sup>
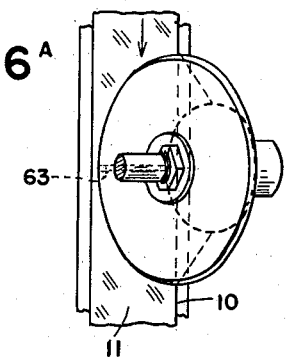
FIG. 6<sup>A</sup>
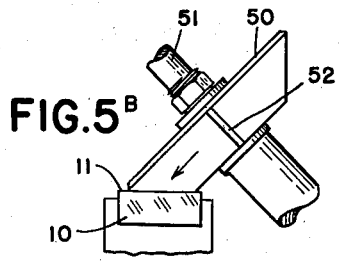
FIG. 5<sup>B</sup>
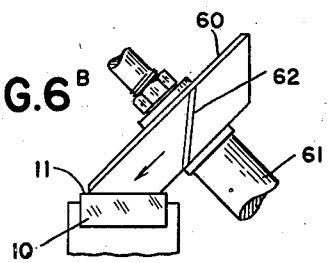
FIG. 6<sup>B</sup>
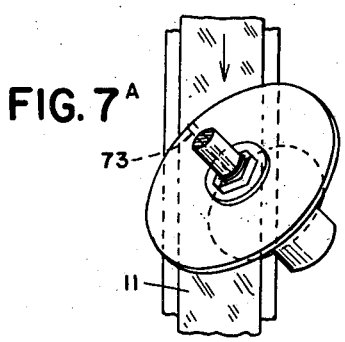
FIG. 7<sup>A</sup>
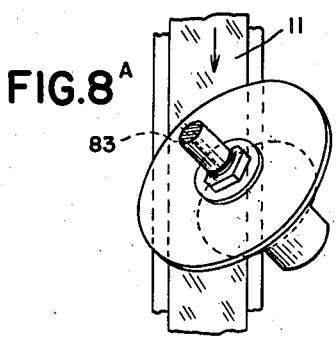
FIG. 8<sup>A</sup>
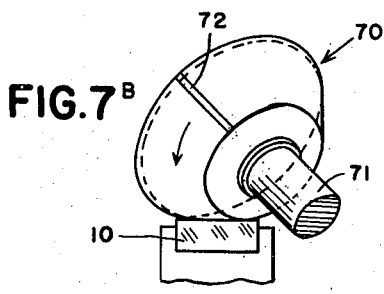
FIG. 7<sup>B</sup>
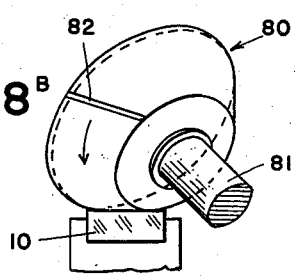
FIG. 8<sup>B</sup>
INVENTOR
ROBERT S. DRUMMOND
BY
Whittemore, Hulbert & Belknap
ATTORNEYS Patented Feb. 27, 1940

2,191,559

UNITED STATES PATENT OFFICE 2,191,559

METHOD OF MILLING FLAT SURFACES

Robert S. Drummond, Detroit, Mich., assignor to National Broach & Machine Company, Detroit, Mich., a corporation of Michigan Application May 2, 1938, Serial No. 205,595

4 Claims. (Cl. 90—11)

The present invention relates to a method and mechanism for finishing flat surfaces.

It is an object of the present invention to finish flat surfaces by the application of a conical finishing tool.

It is a further object of the invention to finish flat surfaces by positioning a conical tool in line contact with the surface and by providing relative translation between the tool and the work piece in a plane containing the line of contact.

It is a further object of the invention to finish a flat surface by contacting the surface with a conical rotary tool and providing relative translation between the tool and work piece in a plane containing the line of contact and in a direction obliquely related to the axis of the tool.

It is a further object of the invention to finish a flat surface by contacting in line contact the surface with a conical tool, providing relative translation between the tool and work piece in a plane containing the line of contact and in a direction obliquely related thereto.

It is a further object of the invention to finish a flat surface by contacting the same with a rotary conical finishing tool and providing for feeding movement between the tool and work piece in a direction oblique to the line of contact.

Other objects of the invention will be apparent as the description proceeds, and when taken in conjunction with the accompanying drawings in which Fig. 1 is a fragmentary elevation of a mechanism adapted to finish a flat surface;

Fig. 5A is a diagrammatic top plan view showing the relative arrangement between the tool and the work piece;

Fig. 5B is an end elevation of the arrangement illustrated in Fig. 5A;

Fig. 6A is a diagrammatic top plan view showing a different relative arrangement of the tool and work piece;

Fig. 6B is an end elevation of the arrangement illustrated in Fig. 6A;

Fig. 7A is a diagrammatic top plan view showing a different relative arrangement of the tool and work piece;

Fig. 7B is an end elevation of the arrangement illustrated in Fig. 7A;

Fig. 8A is a diagrammatic top plan view showing a different relative arrangement of the tool and work piece;

Fig. 8B is an end elevation of the arrangement illustrated in Fig. 8A.

Figure 1:
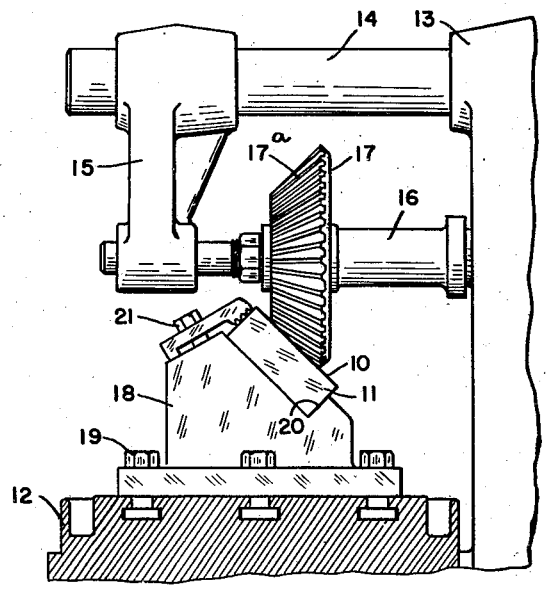

I have illustrated in Fig. 1 a mechanism for finishing a flat surface 10 of a work piece 11. In this embodiment for convenience I have shown the mechanism as comprising elements of a conventional mill having a bed 12 and a column 13 carried by a frame (not shown). The bed 12 is provided with conventional elevating mechanism to raise and lower the bed vertically toward and away from the tool. The bed 12 is also provided with conventional mechanism for translating the same in a horizontal plane and in a direction which in Fig. 1 is perpendicular to the direction of the tool spindle.

Projecting from the column 13 is a tool spindle support 14 which carries at its outer end a bracket 15 adapted to support one end of the tool spindle 16. It will be understood that suitable bearings are provided for rigidly mounting the tool spindle 16. Conventional driving mechanisms (not shown) are connected to the right hand end of spindle 16 and are adapted to rotate the same at any preselected speed by means of change gears or the like. The finishing tool 17 is carried by the spindle 16. As indicated in Fig. 1, this tool is conical and has a series of cutting teeth on the conical surface. In the tool 17 as shown in Fig. 1, the teeth 17ª are straight and occupy a plane which passes through the axis of the tool. In order to accommodate a flat work piece so that its plane surface 10 may be in line contact with the cutter 17, the fixture 18 is bolted as indicated at 19, or otherwise secured to the bed 12. The fixture 18 has a recess 20 therein for the reception of the work piece to be finished and suitable clamping means indicated at 21 are provided to retain the work piece rigidly in the fixture 18.

After securing the work piece 10 and fixture 18, the bed plate 12 is elevated until the surface 10 of the work piece engages the tool in line contact. The tool 17 is rotated by a mechanism previously described at a relatively high rate of speed, and at the same time the bed plate 12 is traversed in a horizontal plane in order to distribute the finishing action of the tool across the surface to be finished. In the event that the surface 10 to be finished is wider than the working surface of the tool 17, the bed plate 12 may be adjusted horizontally toward or away from the column 13 or the fixture 18 may be moved on the bed plate in order to bring a different portion of the area 10 in contact with the cutter 17.

Figure 2:
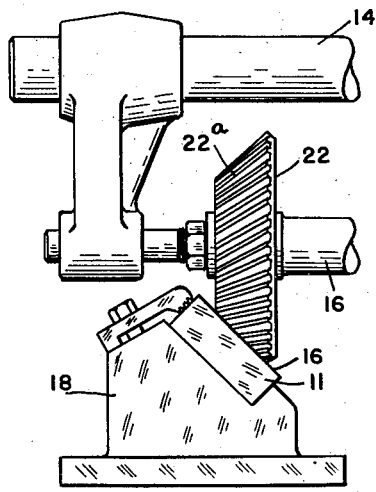
Fig. 2 is a fragmentary view showing a modified form of finishing tool.

In Fig. 2 I have illustrated an arrangement substantially like that of Fig. 1, differing therefrom only in the fact that a modified cutter 22 is substituted for the cutter 17. The cutter 22 is of conical shape, but instead of the teeth 22ᵃ being straight and occupying a plane which contains the axis of the cutter, the teeth are inclined relative to the axis of the cutter so that each tooth is obliquely related to an axial plane intersecting the tooth.

The operation of this mechanism is identical to that of Fig. 1, but a modified form of cutting action will obviously be obtained. Teeth 22ᵃ will progressively come into contact with the work surface 10 and a shearing action will be obtained. It is obvious that the teeth 22ᵃ may be inclined either right or left hand and that different cutting actions will be obtained, as will be explained more fully hereinafter.

Figure 3:
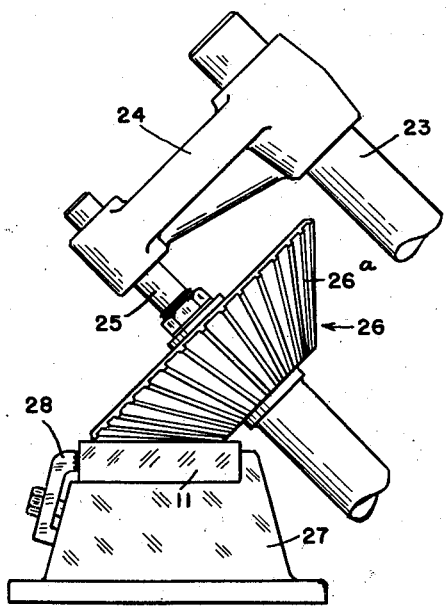
Fig. 3 is a fragmentary view showing a modified mechanism for finishing a flat surface.

In Fig. 3 I have illustrated an arrangement somewhat similar to that shown in Figs. 1 and 2, except that in this instance the spindle support 23 is inclined from the horizontal. The spindle support 23 carries a bracket 24 in which is journaled one end of a tool spindle 25. It will be understood that the support 23 is carried by a suitable column on the machine and that suitable mechanism, preferably incorporating change gears, is provided to rotate the shaft 25 and the tool 26 carried thereby. In this instance a fixture 27 is carried by the bed of the machine which is not shown but which corresponds to the bed 12 shown in Fig. 1. Suitable means 28 are provided to clamp the work piece 10 in the fixture. In this instance the tool 26 is provided with a plurality of so-called straight teeth 26ᵃ corresponding to the teeth 17ᵃ in Fig. 1.

The operation of this mechanism is similar to that previously described. The bed plate of the machine is elevated until the work piece engages in line contact with the conical surface of the cutter 26. The cutter is rotated by means of the mechanism referred to and the work piece is translated in a horizontal plane which in this instance will be perpendicular to the normal plane containing the spindle 25.

Figure 4:
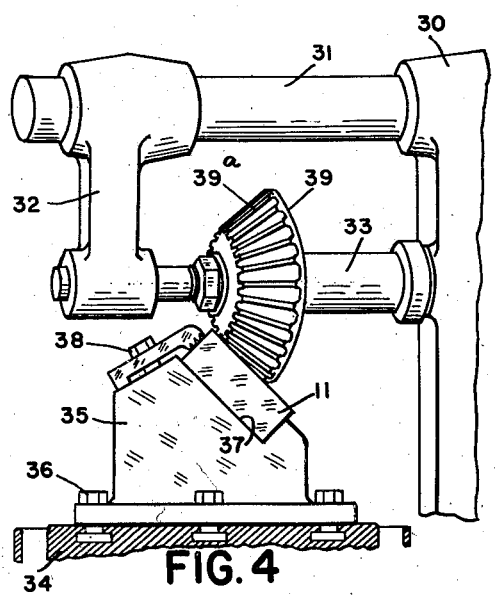
Fig. 4 is a fragmentary view showing still another modified mechanism for finishing a flat surface.

In Fig. 4 I have illustrated a different embodiment of my invention. In this case a column 30 is provided carrying a tool support 31. A bracket 32 is mounted at the outer end of the support 31 and journaled in the lower end of the bracket 32 is one end of the tool spindle 33. The opposite end of the tool spindle 33 is provided with suitable driving mechanism, preferably comprising change gears for the purpose of preselecting the speed at which the spindle 33 is driven. The machine is also provided with a bed plate 34, which is provided with suitable mechanism for elevating and lowering the same toward and away from the tool spindle 33. The bed plate 34 is also provided with mechanism for translating the same in a horizontal plane. Carried by the bed plate 34 is a fixture 35 bolted or otherwise secured thereto as indicated at 36 and which is provided with a recess 37 in which may be clamped a work piece 10 as by suitable clamping means 38.

This form of my invention differs from the form illustrated in Fig. 1 by the fact that the support 31 and the tool spindle 33 are angularly related to the direction of translation of the bed plate 34. In Fig. 4 the bed plate 34 is adapted to be translated in a horizontal plane and in a direction directly toward or away from the observer, that is, a direction perpendicular to the plane of the paper. The support 31 and tool spindle 33 are obliquely related to the direction of translation, and in the embodiment illustrated, as is apparent, the tool spindle 33 extends at an angle of approximately 15° to 30° to the direction of translation.

The cutter or finishing tool 39 is conical, and has a plurality of teeth 39ᵃ on the conical surface. As illustrated, these teeth are straight, that is, occupy a common plane with the axis of the tool, but the teeth may be inclined either right or left hand if desired.

The operation of this mechanism is substantially identical with those previously described, the work piece being mounted on the bed plate 20 by suitable mechanism, elevated until it engages in line contact with the conical surface. The tool is then rotated at relatively high speed while at the same time the bed plate 34 is translated in the direction described, distributing the finishing action across the plane surface being finished.

In all of the machines illustrated in Figs. 1 to 4, it is contemplated that in the event the work piece has a plane surface to be finished which is wider than the working surface of the tool, it may be finished in a plurality of passes by suitably adjusting the work piece relative to the tool, as previously referred to. This adjustment may be accomplished by providing for a preliminary translation of the bed plate of the machine toward or away from the tool supporting column, or by adjusting the work supporting fixture on the bed plate or in some instances, by adjusting the work piece in the fixture.

I have illustrated diagrammatically in Figs. 5A to 8B a number of relative arrangements of tool and work piece. In Figs. 5A and 5B I illustrate a work piece 10 having a plane surface 11 to be finished. The work piece is mounted in mechanism similar to that illustrated in Figs. 1 to 4 for translation in the direction of the arrow. The conical tool 50 is mounted on a spindle 51, the tool being provided in this instance with straight teeth 52, only one of which has been illustrated for clearness. In Fig. 5A the dotted line 53 illustrates the line or narrow zone of contact between the conical cutter 50 and the surface 11.

In Figs. 6A and 6B I have illustrated a different relative arrangement. In this case the work piece 10 having a plane surface 11 is adapted to be translated in the direction of the arrow to distribute the finishing action of the tool thereover. The tool 60 is conical and is provided with a series of inclined teeth 62. A driving spindle 61 is provided for positively rotating the tool 60 at relatively high speed. The dotted lines 63, Fig. 6A, indicate the line or narrow zone of contact between the conical surface of the cutting tool and the plane surface 11 of the work piece 10.

In Figs. 7A and 7B I have illustrated another relationship between the tool and work piece. In this case the work piece 10 having a plane surface 11 to be finished is mounted for translation in the direction of the arrow. The tool 70 is conical in shape and is provided with a series of straight teeth 72 on the conical working surface. A spindle 71 is provided for positively rotating the tool 70 at relatively high speed in contact with the surface to be finished. The dotted lines 73 in Fig. 7A illustrate the line or narrow zone of contact between the conical surface of the cutter and the surface 11 of the work piece.

Figs. 8A and 8B illustrate yet another relationship between the parts. In these figures the work piece 10 having a plane surface 11 to be finished is adapted to be translated in the direction of the arrow for distributing the finishing action over the surface 11. In these figures the tool 80 is conical and is mounted on a tool spindle 81 by means of which it is adapted to be positively rotated at relatively high speed. A series of inclined teeth 82 are provided, only one tooth being illustrated in Fig. 8B for clarity. In Fig. 8A a narrow zone or line of contact is indicated by the dotted lines 83.

In the foregoing I have illustrated more or less diagrammatically suitable mechanism for practicing the herein disclosed invention. It is apparent that other arrangements might be made between a tool and the work piece, such for example as using either right or left hand inclined teeth on the conical surface of the cutter.

By employing a conical cutter in line contact with a plane surface, I have found that it is possible to finish the surface of the work piece more rapidly and at the same time to obtain a better finish than has hitherto been obtainable. It is apparent that when a conical cutting tool is employed, the portion of a tooth at the large end of the cutter is moved at a substantially greater linear velocity than the portion of the same tooth adjacent the small end of the cutter. This relationship appears to contribute to the superior results which have been accomplished. This will be true whether the teeth are straight or inclined and whether the axis of the tool is perpendicular to the direction of feed or oblique thereto.

By employing inclined teeth, the cut of each tooth extends progressively from end to end of the tooth with the result that a shearing action is obtained. This may be combined with the difference in velocity due to the difference in diameter at the large and small end of the tool to obtain predetermined results. For example, it is found that where the tooth of the cutter is inclined so that the end of the tooth adjacent the small end of the cutter comes into contact with the work piece, that a smoother and finer cut results. This is easily explained by the fact that in tools of this type the contact of each cutting blade with the work necessarily is in the nature of an impact. In the conventional type of milling machine, the successive impacts of the teeth oftentimes causes very undesirable vibration or chatter which results in improperly finished work and which limits the output of the machine. In the present case, by selecting a conical cutter with inclined teeth of the proper hand relative to the direction of rotation of the cutter, it is possible to cause each tooth to come into contact with the work at a substantially reduced speed. As the cutting action is distributed along the tooth towards the large end, the relative velocity between each succeeding portion of the tooth and the work increases and the tooth completes its cut at maximum velocity. This type of cutting action is well illustrated in 6B where the tool 60 is rotating in the direction of the arrow and tooth 62 is inclined so that the portion of this tooth located at the small end of the cutter piece contacts the surface 11 of the work.

In addition, it will be recognized that the contour of the cut of each individual tooth will vary from end to end. At the small end of the cutter the teeth move more abruptly into the work and out of the work while at the large end of the cutter the teeth, while cutting into the work at the same depth will sweep across a larger area of the work.

By setting the axis of the tool spindle at an angle to the direction of translation of the work piece as illustrated in Figs. 7A and 8B, a further modification of the cutting action is obtained. In this case it will be apparent the cut per tooth longitudinally of the work piece is increased and this may be varied by adjusting the angularity of the tool spindle to the direction of feed.

One of the most important advantages of employing a conical cutter on this or similar types of work is that the chip clearance between adjacent teeth increases toward the large end of the cutter. This effect is accentuated by forming cutter teeth having a substantially uniform cross section from end to end so that the additional space resulting from the increase in diameter toward the large end of the cutter is all or substantially all employed in providing chip clearance. The advantage of this will be obvious and it is pointed out that where the cutter teeth are inclined so that each tooth engages the work at the end thereof adjacent the small end of the cutter, the chip as it is formed from end to end of the tooth has an ever increasing space for clearance. It has been found that employing conical cutters as outlined above results in chip clearance to an extent greatly in excess of that present when employing cylindrical cutters.

Thus by employing conical cutters having inclined teeth so arranged that each tooth engages the work at the end of the tooth adjacent the small end of the cutter, a smoother finish is imparted to the work, the cutter can be rotated at a substantially higher speed, and at the same time completely adequate chip clearance will result.

I have illustrated mechanism in its simplest form by which my invention may be carried out. Numerous changes and modifications will at once suggest themselves to those skilled in the art. Suitable means may be provided for adjusting the inclination of the work piece relative to the tool spindle or the inclination of the tool spindle relative to the work piece to bring the parts into nice adjustment. As indicated above, suitable mechanism may be provided for moving the bed plate toward or away from the tool supporting column in order to finish different portions of the same flat surface. It is within the scope of this invention to provide a tool supporting column relative to the bed plate which may be rotated about a vertical axis to vary its angular relationship.

It will be understood, of course, that in order to finish the flat surface of the work piece, it will be necessary to insure that the conical tool is positioned so that its contacting conical surface occupies the desired plane of the finished work piece. Suitable refinements may be added, such as vernier adjustments to be used in setting the machine elements to predetermined accurate relationship.

The disclosed method is applicable both to conventional cutting and climb cutting, and the type selected will depend in part upon the choice of the operator.

The foregoing detailed description has been given for clearness of understanding only, and no unnecessary limitations should be understood therefrom, but the appended claims should be construed as broadly as permissible in view of the prior art.

What I claim as my invention is:

1. The method of milling flat surfaces which comprises rotating a frusto-conical cutter having inclined teeth in substantially line contact with the flat surface, and simultaneously providing relative translation between the cutter and surface to distribute the cut, the direction of rotation being such that the end of the teeth near the small end of cutter first contact the work.

2. The method of milling flat surfaces which comprises rotating a frusto-conical cutter in substantially line contact with the flat surface, and simultaneously providing relative translation between the cutter and surface to distribute the cut, the direction of translation being oblique to the axis of the cutter.

3. The method of milling flat surfaces which comprises rotating a frusto-conical cutter having inclined teeth in substantially line contact with the flat surface, the direction of rotation being such that each tooth of said cutter initiates its cut near the small end of said cutter, and relatively translating said cutter and surface in a direction oblique to the said line of contact.

4. The method of milling a flat surface which comprises rotating a milling cutter in line contact with said flat surface and relatively translating said cutter and surface in a direction oblique to said line of contact.

ROBERT S. DRUMMOND.